(12) United States Patent
Crockford

(10) Patent No.: US 12,404,047 B2
(45) Date of Patent: Sep. 2, 2025

(54) DRONE LOADING SYSTEM

(71) Applicant: Digital & Future Technologies Limited, Colchester (GB)

(72) Inventor: Christopher John Crockford, Colchester (GB)

(73) Assignee: Digital & Future Technologies Limited, Colchester (GB)

( * ) Notice: Subject to any disclaimer, the term of this patent is extended or adjusted under 35 U.S.C. 154(b) by 20 days.

(21) Appl. No.: 18/184,422

(22) Filed: Mar. 15, 2023

(65) Prior Publication Data

US 2023/0294849 A1    Sep. 21, 2023

(30) Foreign Application Priority Data

Mar. 15, 2022  (GB) .................................... 2203602

(51) Int. Cl.
*B64U 60/40*   (2023.01)
*B64U 20/83*   (2023.01)
*B64U 101/64*  (2023.01)
*B64U 101/67*  (2023.01)

(52) U.S. Cl.
CPC .............. *B64U 20/83* (2023.01); *B64U 60/40* (2023.01); *B64U 2101/64* (2023.01); *B64U 2101/67* (2023.01); *B64U 2201/10* (2023.01)

(58) Field of Classification Search
CPC ............... B64U 60/40; B64U 2101/60; B64U 2101/64; B64U 2101/67; B64D 1/22
See application file for complete search history.

(56) References Cited

U.S. PATENT DOCUMENTS

| 3,601,342 | A  | * | 8/1971 | Piasecki | B64D 1/22 |
|---|---|---|---|---|---|
|  |  |  |  |  | 212/230 |
| 11,319,064 | B1 | * | 5/2022 | Wittmaak, Jr. | B64D 9/003 |
| 11,608,168 | B2 |  | 3/2023 | Polus |  |
| 2016/0236772 | A1 |  | 8/2016 | Tang |  |
| 2017/0029104 | A1 | * | 2/2017 | Kim | B64U 60/50 |
| 2018/0072415 | A1 | * | 3/2018 | Cantrell | B64D 1/10 |

(Continued)

FOREIGN PATENT DOCUMENTS

| CN | 105923163 |   | 9/2016 |  |
|---|---|---|---|---|
| CN | 106275413 | A * | 1/2017 | ............. B64C 27/14 |

(Continued)

OTHER PUBLICATIONS

Search Report Under Section 17(5) for UK Patent Application No. GB2203602.4, dated Sep. 15, 2022.

(Continued)

*Primary Examiner* — Nicholas McFall
*Assistant Examiner* — Justin Michael Heston
(74) *Attorney, Agent, or Firm* — Andrus Intellectual Property Law, LLP

(57) ABSTRACT

A UAV for transporting a payload comprising a vehicle body; a retractable rail exposed on an underside of the vehicle body; a retraction mechanism coupling the rail to the vehicle body for causing the rail to raise and lower relative to the vehicle body; and a barrier located on the vehicle body so as to confront the rail when the rail is in its raised position to block the removal from the rail of a payload slidably engaged with the rail. A mechanism for advancing a payload onto and along the rail and pushing it off.

15 Claims, 4 Drawing Sheets

(56) References Cited

U.S. PATENT DOCUMENTS

| | | | | |
|---|---|---|---|---|
| 2019/0092468 A1* | 3/2019 | Deutsch | .................... | B64D 1/22 |
| 2020/0017218 A1* | 1/2020 | Ahmad | .................... | B64D 9/00 |
| 2020/0231392 A1* | 7/2020 | Singh | .................... | B65G 61/00 |
| 2021/0247781 A1 | 8/2021 | Liu | | |
| 2021/0399541 A1* | 12/2021 | Johansen | .............. | B64C 39/024 |
| 2022/0355929 A1* | 11/2022 | Gil | ......................... | B64C 17/02 |

FOREIGN PATENT DOCUMENTS

| | | | | | |
|---|---|---|---|---|---|
| CN | 107985564 A | * | 5/2018 | ............ | B64C 25/12 |
| CN | 111196365 | | 5/2020 | | |
| CN | 113895609 A | * | 1/2022 | | |
| WO | 2018057034 | | 3/2018 | | |

OTHER PUBLICATIONS

Search Report Under Section 17 for UK Patent Application No. GB2404076.8, dated May 30, 2024.

* cited by examiner

DRONE LOADING SYSTEM

This invention relates to loading and unloading cargo from unmanned aerial vehicles (UAVs).

When cargo is transported, for example from a warehouse to a consumer, there are typically several stages involved. These include selection or picking of the item, moving the item to a transport area, loading, and there may be a scanning and tagging process to identify the item. There may be a human operator or delivery person at each of these stages. It is becoming increasingly common to automate these processes, for example a robot can pick and transport an item to a transport area.

Conventional shipping uses rail, flight or automotive means to transport goods. UAVs, also known as drones, are used to transport cargo without the need for a human to fly them. UAVs are becoming increasingly common in logistics. The manual loading of cargo onto or into a drone for transport can be time consuming and it is challenging to securely couple the cargo such that it remains attached during flight but removable upon landing. It would be desirable to have a secure system of attaching cargo to a drone. It is also desired to have an automated loading and unloading system to reduce the cost and time involved using human operators.

According to a first aspect of the present invention there is provided a UAV for transporting a payload comprising a vehicle body; a retractable rail exposed on an underside of the vehicle body; a retraction mechanism coupling the rail to the vehicle body for causing the rail to raise and lower relative to the vehicle body; and a barrier located on the vehicle body so as to confront the rail when the rail is in its raised position to block the removal of a payload slidably engaged with the rail.

The retraction mechanism may comprise a leadscrew. The retraction mechanism may comprise a piston. The retraction mechanism may comprise a rack rail.

The rail may be flush with the body when raised.

The rail may comprise a horizontally extending portion for supporting a load that is engaged with it.

The rail may have a cross-sectional profile of an inverted T shape.

The UAV may further comprise a second retractable rail.

The UAV may further comprise a mechanism for moving the payload along the rail.

The mechanism for moving the payload along the rail may comprise a piston.

The mechanism for moving the payload along the rail may comprise a motor.

In a further embodiment, the mechanism can advance a load on to the rail.

When the rail is in a lowered position, the mechanism can push a load off the rail.

The UAV may comprise a flight computer for varying the flight parameters in dependence on the aerodynamic loading.

The UAV may comprise a weight sensor configured to sense a weight loaded on the rail.

The rail may have a built-in barrier at one end.

The UAV may further comprise two barriers, one at each end of the rail, positioned so as to confront the rail when it is in its raised position.

A method of loading a UAV with a payload by lowering a rail from the underside of the vehicle, sliding a payload onto the rail, retracting the rail and blocking the removal of the payload from the rail with a barrier located on the vehicle body so as to confront the rail.

A method of unloading a payload from a UAV using a retraction mechanism to lower a rail from the underside of the vehicle and a mechanism to push the load along and off the rail.

According to a further aspect of the present invention there is provided an unmanned aerial vehicle for transporting a payload comprising a vehicle body; a payload carrier attached to the body for releasably carrying a payload, the payload carrier comprising a latching mechanism whereby a payload can be latched to or released from the payload carrier; a payload release control processor for controlling the latching mechanism to release a payload from the payload carrier; and a flight control processor for controlling the flight of the vehicle; the payload release controller being configured to signal the flight control processor when the latching mechanism is controlled to release a load.

The flight control processor may be configured, on being signalled as aforesaid by the payload release control processor, to alter a total vehicle mass on the basis of which it controls the flight of the vehicle.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the present invention. Thus, the present invention is to be accorded the widest scope consistent with the principles and features disclosed herein.

The present invention relates to an unmanned aerial vehicle (UAV) for transporting a payload. A drone has an underside opposed from one or more propellors. The underside comprises a rail and a mechanism for moving the rail. The rail has a longitudinally extending upward facing surface to support a load. Preferably the surface is substantially flat. Preferably the rail is suitably rigid that is does not plastically deform while supporting a load. The rail may have a second longitudinally extending facing surface. The second surface may extend in a parallel direction to the first surface. The first and second surfaces may be disposed on a track, the track may have a geometric profile such as a rectangle.

A mechanism for moving the rail up and down relative to an underside of the drone may be a retraction mechanism. The retraction mechanism is suitable for varying the distance between the longitudinally extending surface and UAV. The retraction mechanism is coupled to the vehicle and the rail. The retraction mechanism can support the rail and a load.

Figure 1:
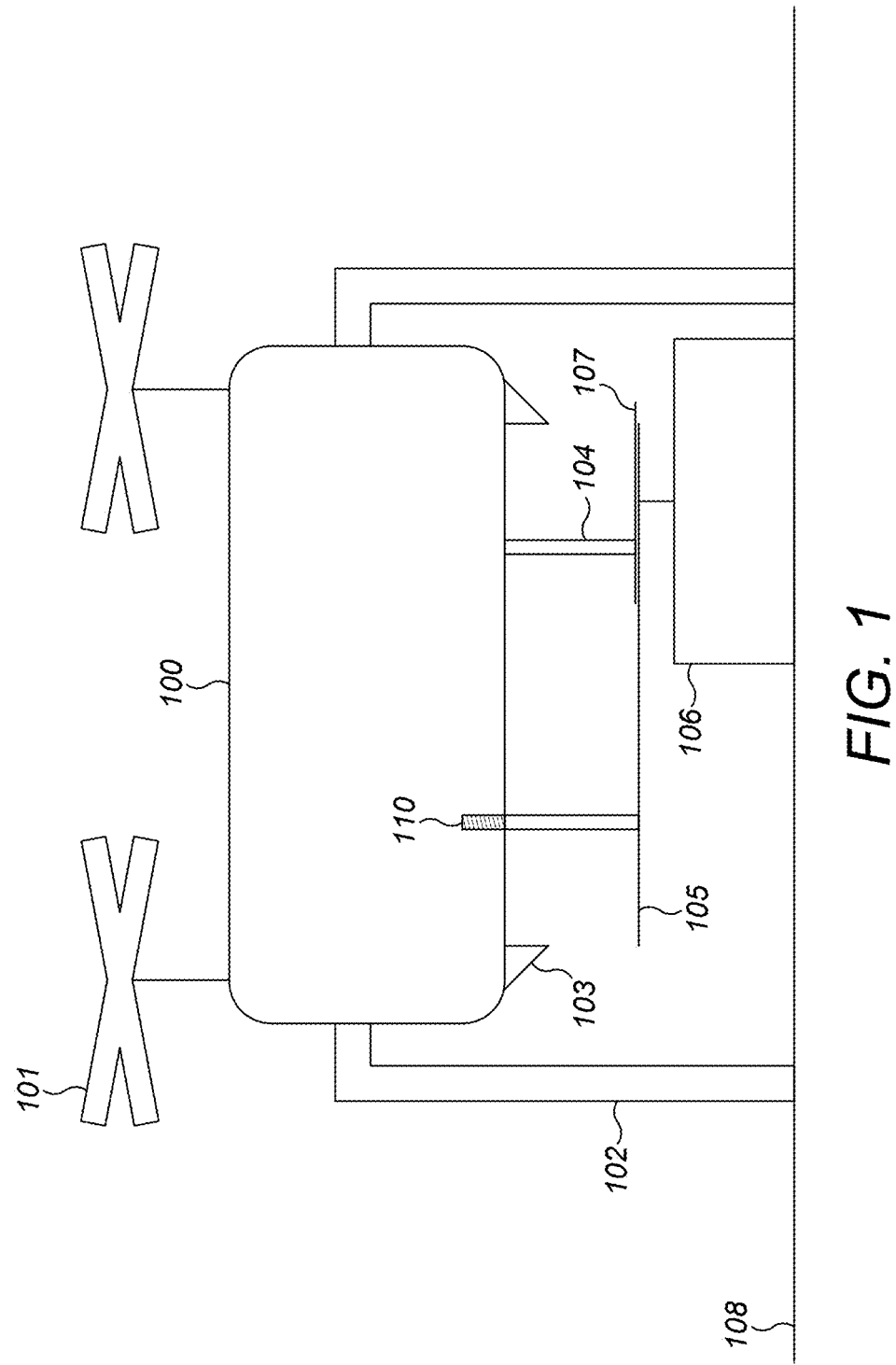
FIG. 1 shows a UAV in a landed position, with a lowered rail system and payload.
Figure 4:
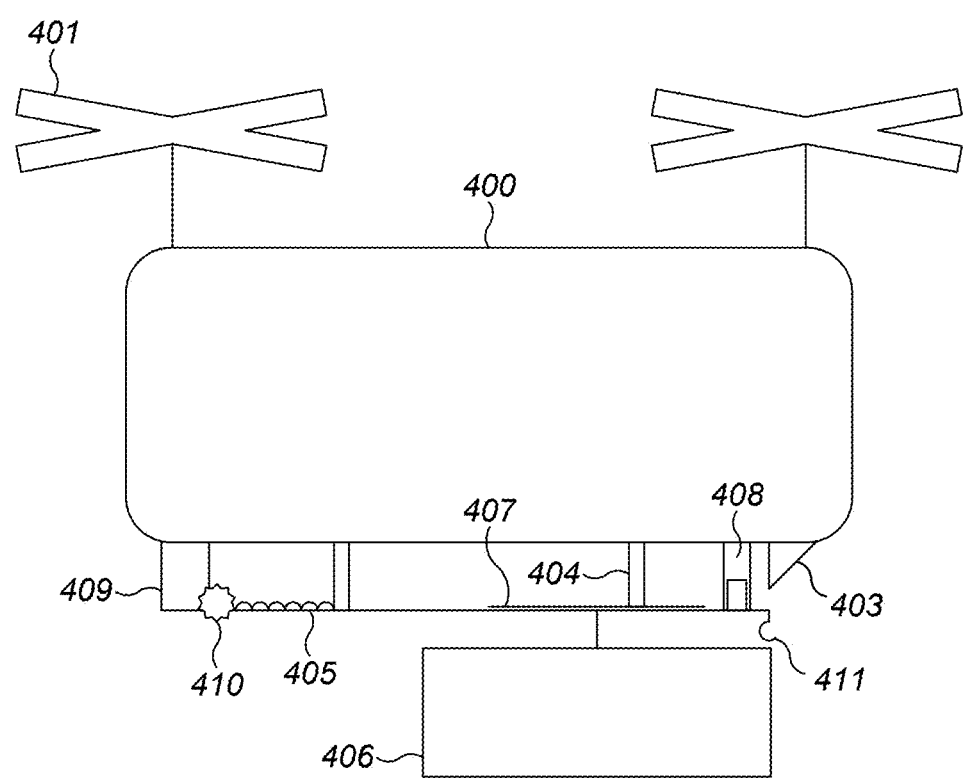
FIG. 4 shows a UAV in a flying configuration with a lowered rail system and mechanism for moving a payload along the rail.

FIG. 1 shows a UAV 100 comprising propellors 101 and landing gear 102. The landing gear 102 is provided as solid struts extending from the vehicle body below the underside of the vehicle for contacting a surface 108 below the vehicle to land. An underside of the UAV has a retraction mechanism 104 and a retractable rail 105 exposed. The retraction mechanism 104 couples the rail 105 to the vehicle body for causing the rail to raise and lower relative to the vehicle body. The retraction mechanism 104 may be one or more leadscrews 110. The retraction mechanism may be telescopic. The retraction mechanism may be a piston or a rack rail (as shown in FIG. 4). The retraction mechanism may be connected to a motor in the vehicle body for actuating movement.

The struts 102 may be variable in length. Extension of the struts raises the UAV and retraction of the struts lowers the UAV relative to a landing surface. This variation in height allows autonomous mobile robots of different height to move under the vehicle and payloads of different heights to be positioned under the vehicle.

The rail 105 may comprise a horizontally extending portion for supporting a load that is engaged with it. The rail 105 is provided as a track capable of slotting together with a rail on a payload 107. In one example, an autonomous mobile robot supporting the payload moves to an end of the rail 105 and advances in a direction parallel to the rail to engage and slide the rail on the payload 107 into the track.

A barrier 103 is located on the vehicle body so as to confront the rail 105 when the rail is in its raised position to block the removal from the rail of a payload 106 slidably engaged with the rail. FIG. 1 shows two barriers 103 positioned at either end of the rail. Alternatively, the rail may have a built-in barrier at one end and only a single barrier on the underside of the vehicle is provided.

The rail system can be manually loaded by a palette trolley by a human operator. The rail may be loaded by an autonomous mobile robot (AMR). The UAV may be provided with visual indicia on the struts 102. An AMR may scan the visual indicia on the struts to align with the UAV for loading or unloading a payload. The AMR may use a machine vision system. The indicia on the struts may be obscured by a payload and the AMR may use this information to avoid attempting to load a UAV already loaded with a payload.

The AMR may comprise visual indicia for indicating a carried load has been transferred to a UAV. This indicia may be provided as lights that illuminate or change colour when the load is transferred such that an observer can see that the load had been safely loaded.

The payload may comprise visual indicia. The UAV may comprise a machine vision system. The machine vision system may scan the visual indicia to identify the payload. The indicia may be a barcode or QR code. A machine vision system may be used to fly the drone rail into engagement with the load. The drone could be provided with its destination by some radiofrequency means at the loading location. Alternatively, the drone could be provided with its destination by scanning the indicia on the payload. This ensures that the payload has an associated location and is sent to the correct place.

The payload may be asymmetric. The UAV flies with the payload preferentially along the axis where the payload is most aerodynamic.

Figure 2:
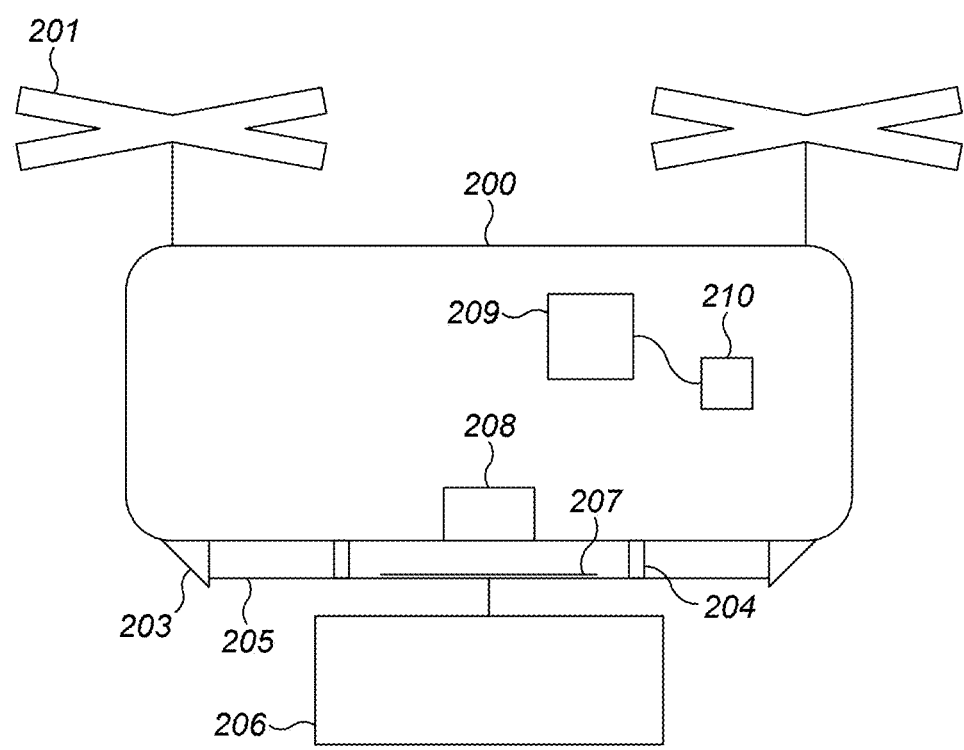
FIG. 2 shows a UAV in a flying configuration with a retracted rail system and coupled payload.

FIG. 2 shows a UAV 200 in a flying configuration with a retracted rail system. The retraction mechanism 204 is shown in a retracted configuration compared to FIG. 1. In the retracted configuration, the rail 205 is blocked at both ends by a barrier 203 positioned on the underside of the vehicle. A payload 207 is connected to a payload rail 206. The payload rail 206 is engaged with the vehicle rail 205. The payload 207 is supported by the vehicle and secured within the track of the rail by the barriers 203

The rail may be flush with the body when raised. The retraction mechanism may retract so as to be fully retained within the vehicle body. The rail in a raised configuration provides little air resistance when the UAV is in flight.

Figure 3:
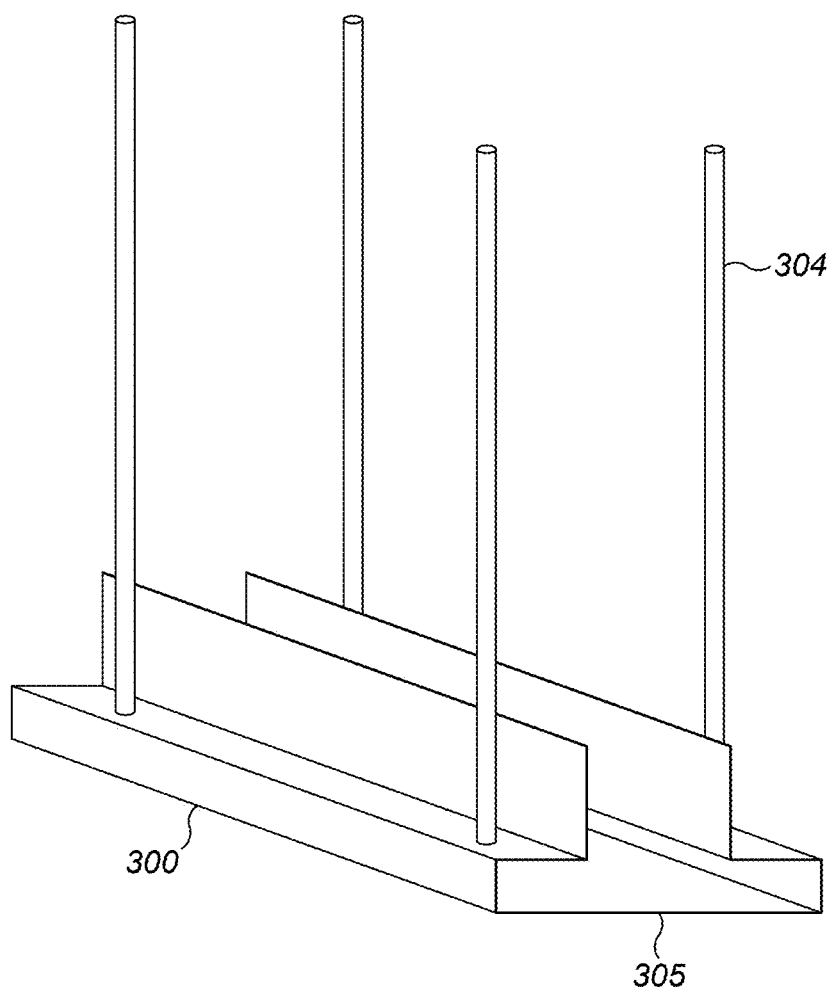
FIG. 3 shows a cross section of the rail.

FIG. 3 shows the rail 300 with a cross-sectional profile of an inverted T shape. The track of the rail 305 is provided as a hollow cavity for receiving a rail on a payload. The rail on a payload may have a corresponding shape to the track such that it fits within the rail. An exemplary retraction mechanism 304 is shown attached to the rail 305. The rail may have an alternative shape such as a cross-sectional T shape, a square or rectangular shape or a circular profile.

FIG. 4 shows an embodiment where the UAV 400 further comprises a mechanism for moving the payload along the rail. The mechanism for moving the payload along the rail may comprise a piston 408. The mechanism may further comprise a motor 409. The mechanism may comprise a rack 405 and pinion 410. The UAV 400 can lower the rail 405 by retraction mechanism 404 to expose an end that is blocked by barrier 403 when in a retracted position. In a flying or landed configuration, the mechanism can push a payload rail 407 coupled to a payload 406 along the lowered rail 405. This may be used to stabilise the UAV by centring the payload along the rail to improve flying dynamics. This may be used to push the payload 406 off of the rail, for example to deliver the payload to a target site.

Payload 406 can be pushed off the rail 405 while the vehicle is in flight. The payload 406 may have an attachment to a parachute. The parachute may be attached to an airframe such that it automatically inflates after detaching from the rail. The parachute may be used to reduce the velocity of the falling payload to reduce or prevent damage upon impact with a landing surface.

In a further embodiment, the mechanism can advance a load on to the rail. A piston 408 may be provided on the underside of the vehicle to urge a payload rail into the track and along it. The piston may direct a pressurised gas at the payload.

The UAV may further comprise a second retractable rail. The second retractable rail may run in a generally parallel direction to the first retractable rail, along an underside of the UAV. A plurality of retractable rails may be provided.

The rail and retraction system are suitably lightweight so as to permit the normal operation of the UAV. The rail, retraction system and at least one barrier can be retrofitted to existing vehicle hardware.

In a further embodiment, there is a UAV comprising a fixed rail, a barrier for confronting an end of the rail and retraction mechanism coupling the barrier to the UAV for moving the barrier relative to an underside of the vehicle. The barrier is movable by the retraction mechanism between a first position in which it does not interface with or confront the rail and a second position in which it covers an end of the rail to block the removal of a payload slidably engaged with the rail. The UAV may comprise a second movable barrier for blocking the other end of the rail. Alternatively, the rail may be formed with a closed end of the track.

The UAV may comprise a weight sensor, as shown at 208 in FIG. 2, coupled to the rail for sensing the load on the rail. The UAV may comprise a further weight sensor or a plurality of weight sensors. The weight sensor may be within the rail. The weight sensor may communicate with a flight computer 209 and the balance loading may be varied in dependence on the sensed weight. The flight computer may comprise a flight control processor 210. The payload may be a substance for distributing such as seeds, pesticide, spray which can be deployed. The dynamic mass of the payload is sensed by the weight sensor 208 and the flight computer 209 may adjust the flight parameters accordingly.

The vehicle may comprise a payload release control processor for controlling a mechanism such as a pawl, a magnet or lifting rails or rail ends as described above for releasing a payload from a payload carrier. The payload carrier could be any suitable mechanism for carrying a payload, such as a rail, a hook (shown as 411 in FIG. 4), a magnet or a hopper. The payload release control processor may comprise one or more microprocessors. It may comprise a memory storing in non-transient form code executable by the microprocessor(s) to enable to the release control processor to perform its function. The vehicle may comprise a flight control processor for controlling the flight of the vehicle. The flight control processor may comprise one or more microprocessors. It may comprise a memory storing in non-transient form code executable by the microprocessor(s) to enable to the flight control processor to perform its function. The flight control processor may compute commands to thrusters of the vehicle to cause it to obey a desired flightpath or hold a desired position in 3D space. When the payload release controller causes a payload to be released, by releasing the latching mechanism, the release control processor may signal that state to the flight control processor. One input to the algorithm employed by the flight control processor may be the overall mass of the vehicle, since that will influence the gravitational force on the vehicle and the vehicle's inertia. When the flight control processor is signalled as indicated above, it may adopt a different value for vehicle mass. That may be a lower value than immediately before. This may help to avoid the vehicle jerking upwards when the load is released.

In one embodiment, the payload is lowered during flight and the movement of the retraction mechanism is detected by the flight computer and the computer varies the thrust to counter the aerodynamic loading of lowering the payload. In another embodiment, the weight sensor may be used to detect the removal of the payload mid-flight and the computer varies the thrust to account for the reduced weight. The thrust may be varied in dependence on the rail lowering and retracting.

The system may have a safety feature that is triggered if the drone power reaches a critical level, or if the drone becomes damaged. The safety feature may be to eject the payload to reduce the load and preserve power necessary for making a landing. The machine vision system may be used for sensing an appropriate area to eject the payload. The machine vision system may be used for sensing an appropriate landing surface.

The UAV may comprise a means for broadcasting its loading state to a receiver. A UAV may broadcast that it is carrying a load to a receiver. The receiver may be on a platform for loading and unloading. The platform may comprise a means for broadcasting a signal to the UAV that it is available for landing on.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. The applicant indicates that aspects of the present invention may consist of any such individual feature or combination of features. In view of the foregoing description, it will be evident to a person skilled in the art that various modifications may be made within the scope of the invention.

The invention claimed is:

1. An unmanned aerial vehicle (UAV) for transporting a payload comprising:
   a vehicle body;
   a retractable rail exposed on an underside of the vehicle body;
   a retraction mechanism coupling the rail to the vehicle body for causing the rail to raise to a raised position and lower to a lowered position relative to the vehicle body;
   a barrier located on the vehicle body so as to confront the rail when the rail is in the raised position to block the removal of a payload slidably engaged with the rail and the barrier is located on the vehicle body so as to not confront the rail when the rail is in the lowered position; and
   a mechanism for moving the payload along the rail, the mechanism comprising a motor.

2. A UAV for transporting a payload as claimed in claim 1, wherein the retraction mechanism comprises a leadscrew.

3. A UAV for transporting a payload as claimed in claim 1, wherein the retraction mechanism comprises a piston or rack rail.

4. A UAV for transporting a payload as claimed in claim 1, wherein the rail is flush with the body when raised.

5. A UAV for transporting a payload as claimed in claim 1, wherein the rail comprises a horizontally extending portion for supporting a load that is engaged with it.

6. A UAV for transporting a payload as claimed in claim 1, wherein the rail has a cross-sectional profile of an inverted T shape.

7. A UAV for transporting a payload as claimed in claim 1, further comprising a second retractable rail.

8. A UAV as claimed in claim 1, wherein the mechanism for moving the payload along the rail comprises a piston.

9. A UAV as claimed in claim 1, wherein the mechanism can advance a load on to the rail.

10. A UAV as claimed in claim 1, wherein, when the rail is in a lowered position, the mechanism can push a load off the rail.

11. A UAV for transporting a payload as claimed in claim 1, further comprising a flight computer for varying the flight parameters in dependence on the aerodynamic loading.

12. A UAV for transporting a payload as claimed in claim 1, wherein the rail has a built-in barrier at one end.

13. A UAV for transporting a payload as claimed in claim 1, further comprising two barriers, one at each end of the rail, positioned so as to confront the rail when it is in its raised position.

14. A method of loading a UAV with a payload, the UAV having a retraction mechanism coupling a retractable rail to a body of the vehicle and a barrier located on the body of the vehicle;
   operating the retraction mechanism to lower the rail to a lowered position from an underside of the vehicle, wherein the barrier does not confront the rail in the lowered position, a mechanism for moving the payload along the rail, the mechanism comprising a motor;
   sliding a payload onto the rail;
   operating the retraction mechanism to retract the rail to a raised position;
   confronting the rail in the raised position with the barrier on the body of the vehicle so the barrier blocks removal from the rail of the payload slidably engaged with the rail; and operating the motor of the mechanism for moving the payload along the rail.

15. The method as claimed in claim 14, further comprising
operating the retraction mechanism to lower the rail from the underside of the vehicle; and
unloading a payload from the UAV using a mechanism to push the payload along and off the rail.

\* \* \* \* \*